UNITED STATES PATENT OFFICE.

HELEN ROSE, OF MILFORD, MASSACHUSETTS.

IMPROVED COMPOSITION FOR PRESERVING AND CURING THE HAIR.

Specification forming part of Letters Patent No. 42,311, dated April 12, 1864.

*To all whom it may concern:*

Be it known that I, HELEN ROSE, of Milford, in the county of Worcester and State of Massachusetts, have invented a new and useful composition for the promotion of the growth of hair and the treatment of diseases of the scalp of the human head; and I do hereby declare the said composition to be composed and made as follows:

The ingredients of it are black tea, chloride of sodium, carbonate or, what is better, the bicarbonate of potassa, and *eau de vie* or French brandy, or their equivalents.

In making the composition, to one quart of boiling water two ounces of the tea are to be added, and the whole is to be suffered to stand for one hour or thereabout, the water in the meantime being kept at or about at a boiling temperature. Afterward add to the decoction two ounces of the chloride of sodium and two ounces of the carbonate or bicarbonate of potassa; and, having throughly dissolved them in the decoction, the solution is to be strained or filtered and to have one gill of *eau de vie* added to it. The composition will then be ready for use, and, when used, is to be rubbed or applied to the scalp, and so as to penetrate the pores thereof and about the roots of the hair.

The astringent principle or property of the tea operates to strengthen the roots and promote the growth of the hair. The chloride of sodium has a curative effect, and will act to eradicate any cutaneous disease about the roots of the hair. The carbonate or bicarbonate of potash tends to destroy animalcula, hair-eaters, or any parasites which may gather on the hair or on or about its roots and prejudice the restoration of the same or the hair. Finally, the *eau de vie* not only has a stimulating effect, but prevents fermentation from taking place in the solution.

I prefer to use the bicarbonate rather than the carbonate of potassa, because the former, although sufficiently alkaline for general purposes, is not so caustic as the latter. The latter, however, may be used in some cases to as good if not better advantage.

I claim—

The composition made of the ingredients and in the manner and for the purpose substantially as specified.

HELEN ROSE.

Witnesses:
R. H. EDDY,
F. P. HALE, Jr.